US011343054B2

(12) United States Patent
Li et al.

(10) Patent No.: US 11,343,054 B2
(45) Date of Patent: May 24, 2022

(54) COMMUNICATION METHOD, NETWORK DEVICE, AND TERMINAL DEVICE

(71) Applicant: HUAWEI TECHNOLOGIES CO., LTD., Guangdong (CN)

(72) Inventors: Hua Li, Shanghai (CN); Hao Tang, Shanghai (CN); Yi Wang, Shanghai (CN); Zhenfei Tang, Shanghai (CN)

(73) Assignee: Huawei Technologies Co., Ltd. and Huawei Technologies Co., Ltd., Guangdong (CN)

( * ) Notice: Subject to any disclaimer, the term of this patent is extended or adjusted under 35 U.S.C. 154(b) by 13 days.

(21) Appl. No.: 16/715,991

(22) Filed: Dec. 16, 2019

(65) Prior Publication Data

US 2020/0119896 A1 Apr. 16, 2020

Related U.S. Application Data

(63) Continuation of application No. PCT/CN2018/090997, filed on Jun. 13, 2018.

(30) Foreign Application Priority Data

Jun. 16, 2017 (CN) .......................... 201710459573.4

(51) Int. Cl.
*H04L 5/00* (2006.01)
*H04L 1/16* (2006.01)
(Continued)

(52) U.S. Cl.
CPC .......... *H04L 5/0092* (2013.01); *H04L 1/1642* (2013.01); *H04L 1/1816* (2013.01); *H04W 72/0453* (2013.01); *H04W 72/1289* (2013.01)

(58) Field of Classification Search
CPC ... H04L 5/0092; H04L 1/1642; H04L 1/1816; H04L 5/0053; H04L 5/0044;
(Continued)

(56) References Cited

U.S. PATENT DOCUMENTS

2015/0131546 A1* 5/2015 Seo ........................ H04W 72/04
370/329
2017/0332387 A1* 11/2017 Zhang ................. H04L 27/2602
(Continued)

FOREIGN PATENT DOCUMENTS

CN 102244559 A 11/2011
CN 105356981 A 2/2016
(Continued)

OTHER PUBLICATIONS

62519705,Specification (Year: 2017).*
(Continued)

*Primary Examiner* — Un C Cho
*Assistant Examiner* — Yu-Wen Chang
(74) *Attorney, Agent, or Firm* — Fish & Richardson P.C.

(57) ABSTRACT

This application provides example communication methods, terminal devices, and network devices. One example method includes configuring, by a network device, a first bandwidth part BP and a second BP for a terminal device. The network device then sends a first TB to the terminal device. When the first BP and the second BP correspond to a same physical parameter, the first TB is mapped onto the first BP and the second BP. When the first BP and the second BP correspond to different physical parameters, the network device further sends a second TB to the terminal device, where the first TB is mapped onto the first BP, and the second TB is mapped onto the second BP.

16 Claims, 8 Drawing Sheets

(51) Int. Cl.
  *H04L 1/18* (2006.01)
  *H04W 72/04* (2009.01)
  *H04W 72/12* (2009.01)

(58) Field of Classification Search
  CPC ... H04L 5/0007; H04L 5/0098; H04L 1/1825; H04L 1/0023; H04L 1/1812; H04L 41/0896; H04W 72/0453; H04W 72/1289; H04W 28/02; H04W 28/0263; H04B 7/26
  See application file for complete search history.

(56) References Cited

U.S. PATENT DOCUMENTS

| | | | | |
|---|---|---|---|---|
| 2018/0049203 | A1* | 2/2018 | Xue | H04L 5/0053 |
| 2018/0270799 | A1* | 9/2018 | Noh | H04L 1/1812 |
| 2018/0278386 | A1* | 9/2018 | Shim | H04W 72/042 |
| 2018/0279310 | A1* | 9/2018 | Chen | H04W 72/048 |
| 2018/0343089 | A1* | 11/2018 | Park | H04L 5/005 |
| 2018/0343154 | A1* | 11/2018 | Park | H04L 5/005 |
| 2019/0288801 | A1* | 9/2019 | Yang | H04L 1/0038 |
| 2019/0313438 | A1* | 10/2019 | Zhang | H04L 5/0094 |
| 2020/0052939 | A1* | 2/2020 | Xiong | H04L 5/0026 |
| 2020/0077432 | A1* | 3/2020 | Xiong | H04L 1/1825 |
| 2020/0112944 | A1* | 4/2020 | Jiang | H04W 72/042 |
| 2020/0120680 | A1* | 4/2020 | Hwang | H04L 5/0044 |
| 2020/0275416 | A1* | 8/2020 | Haghighat | H04W 72/042 |
| 2020/0344761 | A1* | 10/2020 | Amuru | H04L 5/0007 |
| 2021/0127367 | A1* | 4/2021 | Yi | H04W 72/04 |
| 2021/0211343 | A1* | 7/2021 | Baldemair | H04W 72/1263 |

FOREIGN PATENT DOCUMENTS

| | | |
|---|---|---|
| WO | 2011153706 A1 | 12/2011 |
| WO | 2014204285 A1 | 12/2014 |

OTHER PUBLICATIONS

62518848,Specification (Year: 2017).*
62517131, Specification (Year: 2017).*
3GPP TS 36.213 V14.2.0 (Mar. 2017), "3rd Generation Partnership Project; Technical Specification Group Radio Access Network; Evolved Universal Terrestrial Radio Access (E-UTRA); Physical layer procedures (Release 14)," Mar. 2017, 454 pages.
Extended European Search Report and Written Opinion issued in European Application No. 1881817.1 dated May 20, 2020, 10 pages.
Huawei et al.,"On TB mapping for CA," 3GPP TSG RAN WG1 Meeting #87, R1-1611201, Reno, USA, Nov. 14-18, 2016, 2 pages.
Intel Corporation, "Bandwidth parts configuration and operations," 3GPP TSG RAN WG1 Meeting #89, R1-1707420, Hangzhou, China, May 15-19, 2017, 6 pages.
MCC Support, "Draft Report of 3GPP TSG RAN WG1 #89 v0.1.0 (Hangzhou, China, May 15-19, 2017)," 3GPP TSG RAN WG1 Meeting #90, R1-171xxxx, Prague, Czech Rep, Aug. 21-25, 2017, 163 pages.
Nokia, "Summary of email discussion on support for wider bandwidth," TSG-RAN WG1 #55, R1-084316, Prague, Czech Republic, Nov. 10-14, 2008, 3 pages.
PCT International Search Report and Written Opinion issued in International Application No. PCT/CN2018/090997 dated Aug. 23, 2018, 15 pages (with English translation).
Samsung, "RAN2 impacts from bandwidth part in NR," 3GPP TSG-RAN WG2 NR #98 Meeting, R2-1704503, Hangzhou, China, May 15-19, 2017, 6 pages.
Office Action issued in Chinese Application No. 201710459573.4 dated Sep. 24, 2020, 15 pages (with English translation).

* cited by examiner

COMMUNICATION METHOD, NETWORK DEVICE, AND TERMINAL DEVICE

CROSS-REFERENCE TO RELATED APPLICATIONS

This application is a continuation of International Application No. PCT/CN2018/090997, filed on Jun. 13, 2018, which claims priority to Chinese Patent Application No. 201710459573.4, filed on Jun. 16, 2017. The disclosures of the aforementioned applications are hereby incorporated by reference in their entireties.

TECHNICAL FIELD

Embodiments of this application relate to the field of communications technologies, and in particular, to a communication method, a network device, and a terminal device.

BACKGROUND

A long term evolution (LTE) system standard formulated by the 3rd generation partnership project (3GPP) is considered as a fourth-generation wireless access system standard. In an existing LTE system, one system bandwidth is configured for a base station. The system bandwidth may be understood as one carrier bandwidth. Data may be transmitted between the base station and UE on a full bandwidth of the carrier bandwidth. A minimum value of a bandwidth capability supported by a terminal device is not less than the carrier bandwidth. In LTE, the carrier bandwidth may be 1.8 MHz, 3 MHz, 5 MHz, 10 MHz. 15 MHz, or 20 MHz, and a minimum bandwidth capability of the UE is 20 MHz. Therefore, an operating bandwidth of the UE is greater than or equal to the carrier bandwidth.

With a requirement for a variable scenario and a variable service in a communications system, in a next-generation communications system, for example, a new radio (NR) system that is alternatively referred to as a fifth-generation (5G) radio access system, a higher carrier bandwidth is supported, for example, a maximum carrier bandwidth may be 400 MHz. However, some terminal devices do not have a capability of supporting the maximum carrier bandwidth, or a service requirement of a terminal device does not need such a high carrier bandwidth. Therefore, in the next-generation communications system, a two-level method for indicating user resource allocation is proposed. First, a bandwidth that is less than or equal to a maximum bandwidth supported by a user is indicated in a carrier bandwidth as a bandwidth part (BP) of user equipment, and a second step is to indicate a resource block or a resource block set that is specifically scheduled for the user equipment in the bandwidth part. For example, the BP includes 0 to 199 PRBs, and a base station further instructs the terminal device to transmit data on 0 to 99 PRBs in the 0 to 199 PRBs. Further, if the terminal device supports a plurality of BPs, how to design a resource mapping from a transport block (TB) to the BP becomes a technical problem that needs to be urgently resolved.

SUMMARY

This application provides a communication method, a network device, and a communications system, to resolve a resource mapping problem for a TB when one UE supports a plurality of BPs, effectively reduce resource waste, and help reduce energy consumption of the UE.

According to a first aspect, this application provides a communication method, and the method includes: after configuring a first BP and a second BP for a terminal device, sending, by a network device, a first TB to the terminal device. When the first BP and the second BP correspond to a same numerology, the first TB is mapped onto the first BP and the second BP.

According to the foregoing solution provided in this application, when the first BP and the second BP correspond to the same numerology, a resource is mapped to the first TB on the first BP and the second BP, so that the network device needs to send only one piece of DCI. According to the solution in this application, system overheads caused by sending of the DCI can be effectively reduced, system resources are saved, and energy consumption required for detecting a plurality of pieces of DCI by UE are also reduced.

In an optional design, when the first BP and the second BP correspond to the same numerology, a physical resource block PRB index of the first BP and a PRB index of the second BP are consecutively numbered in a frequency domain resource occupied by the first BP and the second BP.

A plurality of BPs with a same numerology are numbered with consecutive PRB numbers, so that relatively large resource allocation overheads caused by unified numbering at a cell bandwidth granularity are effectively reduced. Further, the plurality of BPs are consecutively numbered, thereby effectively avoiding overheads of an indication field that is used to indicate internal resource configuration information of a single BP when the BP is independently numbered.

In an optional design, when the first BP and the second BP correspond to the same numerology, before the sending, by a network device, a first transport block TB to the terminal device, the method further includes: sending, by the network device, first control information to the terminal device, where the first control information is configured in the first BP or the second BP, and is used to schedule the first BP and the second BP; and sending, by the network device, first information to the terminal device, where the first information is used to indicate a time-frequency location of the first control information.

When there are a plurality of activated BPs, the plurality of BPs are scheduled by using one piece of DCI. Therefore, the UE needs to monitor only one piece of DCI, so that resources consumed by the UE in detecting a CORESET configured in each BP are reduced, thereby helping reduce energy consumption of the terminal device.

In an optional design, when the first BP and the second BP correspond to the same numerology, before the sending, by a network device, a first transport block TB to the terminal device, the method further includes: determining, by the network device based on a bandwidth of the first BP and a bandwidth of the second BP, a size of an RBG allocated to the first TB.

In an optional design, when the first BP and the second BP correspond to the same numerology, the first BP and the second BP are in a same BP group, and before the sending, by a network device, a first transport block TB to the terminal device, the method further includes: sending, by the network device, second information to the terminal device. The second information is used to indicate an identifier ID of the BP group. All BPs included in the BP group correspond to a same numerology, and an ID of the BP group is used by the terminal device to determine the first BP and the second BP.

When there are a plurality of BPs with a same numerology, some or all of the BPs may be selected to form a BP group, thereby facilitating flexible resource utilization.

In an optional design, when the first BP and the second BP correspond to the same numerology, before the sending, by a network device, a first transport block TB to the terminal device, the method further includes: determining, by the network device based on bandwidths of all the BPs included in the BP group, a size of an RBG allocated to the first TB.

In an optional design, the network device further configures a third BP for the terminal device, and when the first BP and the second BP correspond to the same numerology, a numerology corresponding to the third BP is different from the numerology corresponding to the BP group. The method further includes: sending, by the network device, a second TB to the terminal device, where the second TB is mapped onto the third BP.

In an optional design, when the first BP and the second BP correspond to different numerologies, the method further includes: sending, by the network device, a third TB to the terminal device, where the first TB is mapped onto the first BP, and the third TB is mapped onto the second BP.

In an optional design, when the first BP and the second BP correspond to the different numerologies, a PRB index of the first BP is independently numbered in the first BP, and a PRB index of the second BP is independently numbered in the second BP. Independent numbering is performed in the BP, thereby effectively reducing relatively large resource allocation overheads caused by unified numbering at a cell bandwidth granularity.

In an optional design, when the first BP and the second BP correspond to the different numerologies, before the network device sends the first TB and the third TB to the terminal device, the method further includes:

determining, by the network device based on the bandwidth of the first BP, a size of an RBG allocated to the first TB, and determining, by the network device based on the bandwidth of the second BP, a size of an RBG allocated to the third TB.

In an optional design, when the first BP and the second BP correspond to the different numerologies, before the network device sends the first TB and the third TB to the terminal device, the method further includes: allocating, by the network device, a first hybrid automatic repeat request HARQ process to the first TB, and sending third information to the terminal device, where the third information is used to indicate an identity ID of the first HARQ process; and allocating, by the network device, a second HARQ process to the third TB, and sending fourth information to the terminal device, where the fourth information is used to indicate an ID of the second HARQ process. The network device allocates respective HARQ processes to different TBs, and the terminal device performs HARQ combination based on IDs of the respective HARQ processes, thereby improving transmission reliability.

According to a second aspect, this application provides a communication method, and the method includes: determining, by a terminal device, a first bandwidth part BP and a second BP; and receiving, by the terminal device, a first transport block TB sent by a network device. When the first BP and the second BP correspond to a same numerology, the first TB is mapped onto the first BP and the second BP.

In an optional design, when the first BP and the second BP correspond to the same numerology, a physical resource block PRB index of the first BP and a PRB index of the second BP are consecutively numbered in a frequency domain resource occupied by the first BP and the second BP.

In an optional design, when the first BP and the second BP correspond to the same numerology, before the receiving, by the terminal device, a first transport block TB sent by a network device, the method further includes: receiving, by the terminal device, first control information sent by the network device, where the first control information is configured in the first BP or the second BP, and is used to schedule the first BP and the second BP; and receiving, by the terminal device, first information sent by the network device, where the first information is used to indicate a time-frequency location of the first control information.

In an optional design, when the first BP and the second BP correspond to the same numerology, the method further includes: determining, by the terminal device based on a bandwidth of the first BP and a bandwidth of the second BP, a size of a physical resource block group RBG allocated to the first TB.

In an optional design, when the first BP and the second BP correspond to the same numerology, the first BP and the second BP are in a same BP group, and before the terminal device determines the first BP and the second BP, the method further includes: receiving, by the terminal device, second information sent by the network device, where the second information is used to indicate an identifier ID of the BP group, and all BPs included in the BP group correspond to a same numerology; and that the terminal device determines the first BP and the second BP specifically includes: determining, by the terminal device, the first BP and the second BP based on the ID of the BP group.

In an optional design, when the first BP and the second BP correspond to the same numerology, the method further includes: determining, by the terminal device based on bandwidths of all the BPs included in the BP group, a size of an RBG allocated to the first TB.

In an optional design, the method further includes: determining, by the terminal device, a third BP; and when the first BP and the second BP correspond to the same numerology, and a numerology corresponding to the third BP is different from the numerology corresponding to the BP group, the method further includes: receiving, by the terminal device, a second TB sent by the network device, where the second TB is mapped onto the third BP.

In an optional design, when the first BP and the second BP correspond to different numerologies, the method further includes: receiving, by the terminal device, a third TB sent by the network device, where the first TB is mapped onto the first BP, and the third TB is mapped onto the second BP.

In an optional design, when the first BP and the second BP correspond to the different numerologies, a PRB index of the first BP is independently numbered in the first BP, and a PRB index of the second BP is independently numbered in the second BP.

In an optional design, when the first BP and the second BP correspond to the different numerologies, the method further includes: determining, by the terminal device based on the bandwidth of the first BP, a size of the RBG allocated to the first TB; and determining, by the terminal device based on the bandwidth of the second BP, a size of an RBG allocated to the third TB.

In an optional design, when the first BP and the second BP correspond to the different numerologies, the method further includes: receiving, by the terminal device, third information sent by the network device, where the third information is used to indicate an identifier ID of a first HARQ process, and the first HARQ process corresponds to the first TB; and receiving, by the terminal device, fourth information sent by the network device, where the fourth information is used to indicate an ID of a second HARQ process, and the second HARQ process corresponds to the third TB.

For descriptions of technical effects of the second aspect and the possible designs in the second aspect, refer to descriptions of the foregoing corresponding parts. Details are not described herein again.

According to a third aspect, this application provides a network device, configured to perform the method in the first aspect or any possible design in the first aspect. Specifically, the network device includes units configured to perform the method in the first aspect or any possible design in the first aspect.

According to a fourth aspect, this application provides a terminal device, configured to perform the method in the second aspect or any possible design in the second aspect. Specifically, the network device includes units configured to perform the method in the second aspect or any possible design in the second aspect.

According to a fifth aspect, this application provides a network device, including a transceiver, a processor, and a memory. The transceiver, the processor, and the memory may be connected by using a bus system. The memory is configured to store a program, an instruction, or code, and the processor is configured to execute the program, the instruction, or the code in the memory to complete the method in the first aspect or any possible design in the first aspect.

According to a sixth aspect, this application provides a terminal device, including a transceiver, a processor, and a memory. The transceiver, the processor, and the memory may be connected by using a bus system. The memory is configured to store a program, an instruction, or code, and the processor is configured to execute the program, the instruction, or the code in the memory to complete the method in the second aspect or any possible design in the second aspect.

According to a seventh aspect, this application provides a computer readable storage medium, where the computer readable storage medium stores an instruction, and when the instruction is run on a computer, the computer is enabled to perform the method in the first aspect or any possible design in the first aspect or the method in the second aspect or any possible design in the second aspect.

According to an eighth aspect, this application provides a communications system, including the network device in the third aspect or the fifth aspect, and the terminal device in the fourth aspect or the sixth aspect.

According to the method and apparatus provided in this application, cases in which a plurality of BPs correspond to a same numerology or different numerologies are provided when a plurality of activated BPs exist at the same time, so that a resource mapping problem for a TB when a plurality of activated BPs is configured for one UE at the same time is effectively resolved, thereby helping save system resources and reduce energy consumption of a terminal device.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

Figure 1:
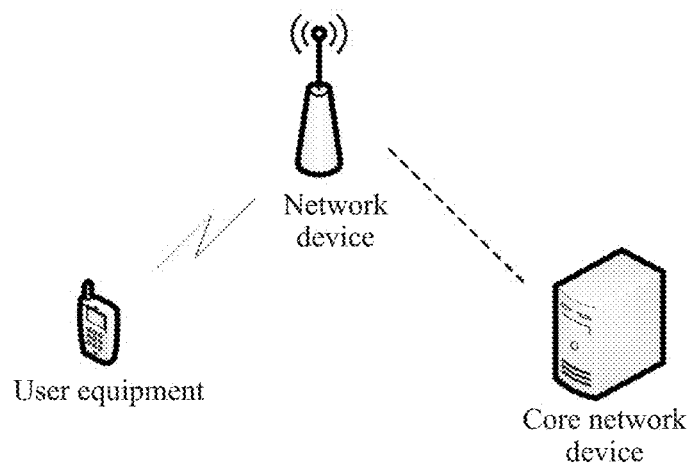
FIG. 1 is a schematic diagram of an application network scenario of a communication method according to an embodiment of this application.

Technical solutions of embodiments of this application may be applied to various communications systems, for example, an NR system, a wireless fidelity (wifi) system, a worldwide interoperability for microwave access (WiMAX) system, a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunication system (UMTS), a cellular system related to the 3rd generation partnership project (3GPP), and a fifth generation (5G) mobile communications system.

Some terms in this application are described below, to help understanding of a person skilled in the art.

(1) A "network device" described in this application, also referred to as an "access network device", may be a gNB (gNodeB), may be a common base station (for example, a NodeB (NB) in a WCDMA system, an evolved NodeB (eNB or eNodeB) in an LTE system, or a base transceiver station (BTS) in a GSM or CDMA system), may be a new radio controller (NR controller), may be a centralized unit, may be a new radio base station, may be a remote radio module, may be a mobility management entity (MME), may be a micro base station, may be a distributed unit, may be a transmission reception point (TRP) or a transmission point (TP), or may be a radio controller in a cloud radio access network (CRAN) scenario, or the network device may be a relay node, an access point, an in-vehicle device, a wearable device, a network device in a future 5G network, or any other radio access device. However, the embodiments of this application are not limited thereto.

(2) A "terminal device" described in this application may be a wireless terminal device or a wired terminal device. The wireless terminal device may be a device that provides voice and/or data connectivity for a user, a handheld device with a wireless connection function, or another processing device connected to a wireless modem. The wireless terminal device may communicate with one or more core networks through a radio access network (RAN). The wireless terminal device may be a mobile terminal device, such as a mobile phone (also referred to as a "cellular" phone) and a computer with a mobile terminal device, for example, may be a portable, pocket-sized, handheld, computer built-in, or in-vehicle mobile apparatus, which exchanges voice and/or data with the radio access network. For example, the wireless terminal device may be a device such as a personal communications service (PCS) phone, a cordless telephone set, a session initiation protocol (SIP) phone, a wireless local loop (WLL) station, or a personal digital assistant (PDA). The wireless terminal device may also be referred to as a system, a subscriber unit (SU), a subscriber station (SS), a mobile station (MB), a remote station (RS), an access point (AP), a remote terminal (RT), an access terminal (AT), a user terminal (UT), a user agent (UA), a terminal device (UD), or user equipment (UE). For ease of description, in the embodiments of this application, the terminal device and the UE are often used alternately.

(3) A "bandwidth part" described in this application is a part of a channel bandwidth, and may also be referred to as an "operating bandwidth (" or a transmission bandwidth, a mini BP, a BP unit, a BP subband, or the like, and may be referred to as a BP for short, and may also be referred to as a BWP for short. A name and an abbreviation of the bandwidth part are not specifically limited in the embodiments of this application. The BP is a bandwidth determined in the first step of two-level resource allocation during data transmission, and may be a segment of consecutive resources in frequency domain. For example, one bandwidth part includes K consecutive subcarriers, where K>0; or one bandwidth part is a frequency domain resource in which N non-overlapping consecutive resource blocks are located, where N>0; or one bandwidth part is a frequency domain resource in which M non-overlapping consecutive resource block groups (RBG) are located, where M>0, where one RBG includes P consecutive RBs, where P>0. One bandwidth part is associated with one specific numerology set, and the numerology set includes at least one of a subcarrier spacing and a cyclic prefix (CP).

(4) A carrier bandwidth may also be referred to as a "channel bandwidth" or a "system bandwidth", and is a cell-level bandwidth determined by a base station side.

(5) A "numerology" described in this application is a series of physical layer parameters in an air interface. In specific implementation, optionally, one BP may correspond to one numerology. The numerology includes a subcarrier spacing, a time unit type, a cyclic prefix (CP) type, or the like. The subcarrier spacing is used as an example. If a terminal device supports a subcarrier spacing of 15 kHz and a subcarrier spacing of 30 kHz, a base station may allocate a BP whose subcarrier spacing is 15 KHz and a BP whose subcarrier spacing is 30 KHz to the terminal device. The terminal device may switch to different BPs based on different scenarios and service requirements, or transmit data on two or more BPs at the same time. When the terminal device supports a plurality of BPs, numerologies corresponding to all the BPs may be the same or different.

(6) A control channel is a channel used to carry downlink control information (DCI), for example, a physical downlink control channel (PDCCH) in LTE, an enhanced physical downlink control channel (EPDCCH), a new radio physical downlink control channel (NR-PDCCH), or a control channel that is in an NR system and that is used to perform a same or similar function.

(7) A time domain location is a location of an orthogonal frequency division multiplexing (OFDM) symbol in a scheduling unit in time domain. The scheduling unit in time domain may be a unit including one slot, one subframe, or one mini-slot, or a unit formed by aggregating a plurality of slots, a plurality of subframes, or a plurality of mini-slots. The slot may occupy L consecutive OFDM symbols in time domain, and L is a natural number greater than 0. A value of L may be determined based on an actual situation, for example, 7 or 14 OFDM symbols. A small slot may also be referred to as a mini-slot, and occupies a plurality of consecutive OFDM symbols in time domain, and a quantity of occupied consecutive OFDM symbols is less than a quantity of OFDM symbols occupied by a slot in which the small slot is located. One slot may include a plurality of small slots.

In addition, the term "and/or" in this specification describes only an association for describing associated objects and represents that three relationships may exist. For example, A and/or B may represent the following three cases: Only A exists, both A and B exist, and only B exists.

Unless otherwise stated, ordinal numbers such as "first", "second", "third", and "fourth" mentioned in the embodiments of this application are used to distinguish between a plurality of objects, and are not used to limit a sequence, a time sequence, a priority, or importance of the plurality of objects.

An application scenario of the embodiments of this application is briefly described below.

In a wireless communications system, when a terminal device needs to send uplink data to a base station, or when the base station sends downlink data to the terminal device, the base station needs to first allocate some bandwidths to the terminal device from carrier bandwidths supported by a system. In LTE, after the base station configures one system bandwidth by using a MIB, the base station directly indicates, to the terminal device, a physical resource block used to transmit data in the system bandwidth, to transmit data between the base station and the terminal device on a full bandwidth of the system bandwidth.

In this application, for simplicity, "network device" and "base station" are often used alternately, and "terminal device" and "user equipment (UE)" are often used alternately, and "system bandwidth" and "carrier bandwidth" are often used alternately. However, a person skilled in this application should understand their meanings.

An application scenario of the embodiments of this application is briefly described below.

In a wireless communications system, when a terminal device needs to send uplink data to a base station, or when the base station sends downlink data to the terminal device, the base station needs to first allocate a BP to the terminal device from carrier bandwidths supported by a system. In LTE, after the base station configures one system bandwidth by using a master information block (MIB), the base station directly indicates, to the terminal device, a physical resource block used to transmit data in the system bandwidth, to transmit data between the base station and the terminal device on a full bandwidth of the system bandwidth.

FIG. 1 is a diagram of a system architecture of an example communications system according to an embodiment of this application. The communications system includes a core network device, a network device, and user equipment. The network device is configured to provide a communications service for the user equipment and access a core network. The user equipment accesses a network by searching for a synchronization signal, a broadcast signal, and the like that are sent by the network device. The example communications system may be, for example, an LTE communications system, or may be a future communications system using a 5G new radio NR technology. The LTE communications system is used as an example. The core network device may include, for example, a mobility management entity (MME) or a serving gateway (S-GW). The MME is mainly responsible for a signaling processing part, namely, a control plane function, including functions such as access control, mobility management, attachment and detachment, a session management function, and gateway selection. The S-GW is mainly responsible for a user plane function of forwarding user data, in other words, routing and forwarding a data packet under the control of the MME. The network device is mainly responsible for at least one of functions such as radio resource management, quality of service (QoS) management, and data compression and encryption on an air interface side. On a core network side, the network device is mainly responsible for forwarding control plane signaling to the MME and forwarding user plane service data to the S-GW.

It should be noted that FIG. 1 is only a schematic diagram. Only interaction between one network device, one terminal device, and one core network device is used as an example for description, and an application scenario of this application should not be limited. The communications system may further include another network device, for example, a wireless relay device and a wireless backhaul device (not shown). Quantities of core network devices, radio access network nodes, and terminals that are included in the communications system are not limited in embodiments of this application.

The embodiments of this application are described in detail below with reference to the accompanying drawings, to help understanding of a person skilled in the art.

Figure 2:
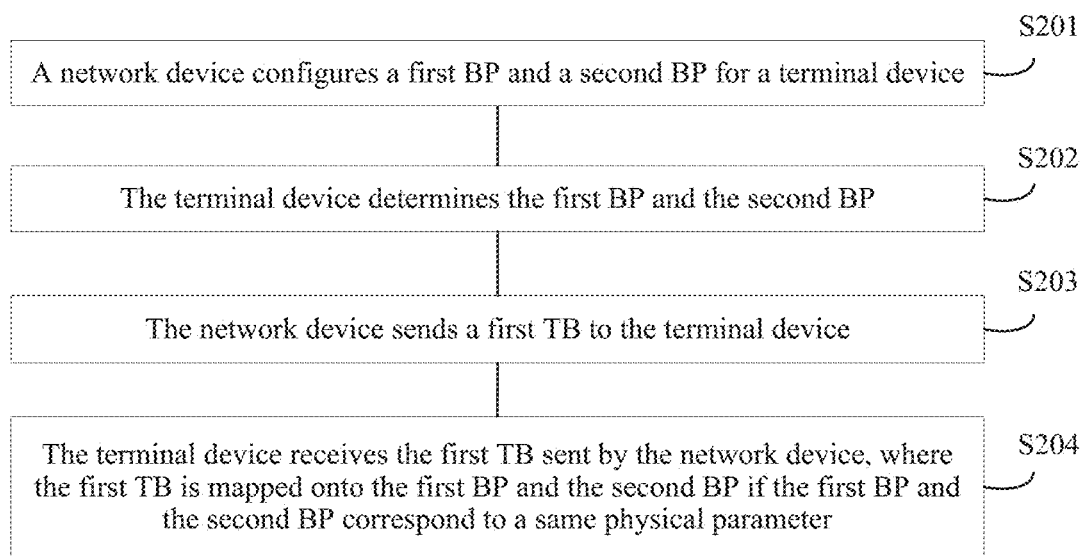
FIG. 2 is a schematic flowchart of a communication method according to an embodiment of this application.

FIG. 2 is a schematic flowchart of a communication method 200 according to an embodiment of this application. The method 200 may be applied to the scenario shown in FIG. 1. The method 200 includes the following steps.

S201. A network device configures a first BP and a second BP for a terminal device.

Specifically, in this application, both the first BP and the second BP are activated. After a BP is activated, UE needs to detect a control channel of the BP, and perform channel measurement and reporting, and the UE may send or receive data on the activated BP. Similarly, when a BP is in an inactive state, the UE does not need to detect a control channel of the BP, and does not need to perform channel measurement and reporting, and the UE cannot send or receive data on the inactive BP.

How to activate the first BP and the second BP is specifically described below.

In a specific implementation, the terminal device currently works on the first BP, and the first BP is activated. The network device sends first signaling to the terminal device, and the first signaling is used to activate the second BP. After the terminal device receives the first signaling, the second BP is activated. Certainly, a person skilled in the art may understand that the terminal device may alternatively work on the second BP, and the first signaling is used to activate the first BP.

In another specific implementation, the network device sends second signaling to the terminal device, and the second signaling is used to activate the first BP and the second BP.

In another specific implementation, the network device activates the second BP in an implicit manner by scheduling the second BP on the first BP.

It should be understood that a manner of activating the first BP and the second BP is not specifically limited in this application. The first signaling or the second signaling may be carried in downlink control information (DCI) signaling, or may be carried in higher layer signaling such as radio resource control (RRC) signaling or a media access control control element (MAC CE), or may be carried in dedicated signaling. This is not specifically limited in this application. A person skilled in the art may understand that the network device may configure a third BP or more BPs for the terminal device, and the UE may support more than two activated BPs at the same time. In embodiments of this application, for simplicity, only the first BP and the second BP are used as an example for description.

S202. The terminal device determines the first BP and the second BP.

Specifically, the terminal device determines the first BP and the second BP based on a configuration of the network device.

In embodiments of this application, a quantity of BPs configured and activated by the network device for the terminal device is greater than or equal to 2. The network device may configure a plurality of BPs for the terminal device at the same time. For example, the network device configures the first BP and the second BP for the terminal device at the same time, and may also activate the first BP and the second BP at the same time. Alternatively, the network device may configure different BPs for the terminal device at different moments. For example, the network device configures and activates the first BP for the terminal device at a first moment, and configures and activates the second BP for the terminal device at a second moment, where the first moment may be before the second moment, or the first moment may be after the second moment.

In a specific implementation, the first BP or the second BP may be a BP allocated by the network device to the terminal device during initial access of the terminal device. If the first BP or the second BP is the BP allocated by the network device to the terminal device during the initial access of the terminal device, the first BP or the second BP may be activated by default. For example, the network device may send a master information block (MIB) to the terminal device. After receiving the MIB, the terminal device may determine, based on the MIB, the first BP allocated by the network device to and activated by the network device for the terminal device. Alternatively, the terminal device may learn, based on predefined information, the first BP or the second BP allocated by the network device to and activated by the network device for the terminal device, for example, the terminal device determines a frequency domain resource of a synchronization signal by blindly detecting the synchronization signal, and determines a frequency domain resource of the first BP or a frequency domain resource of the second BP based on a predefined relationship. When the network device configures a plurality of BPs for the terminal device, one of the plurality of BPs may be the BP allocated by the network device to the terminal device during the initial access of the terminal device. For a specific configuration manner, refer to the foregoing descriptions. Details are not described again.

In a specific implementation, the first BP or the second BP may be a BP allocated by the network device to the terminal device after the terminal device accesses a network. For example, the network device may send a system information block (SIB) to the terminal device. After receiving the SIB, the terminal device may determine, based on the SIB, the first BP or the second BP allocated by the network device to the terminal device. Alternatively, the network device may send radio resource control RRC signaling to the terminal device, and after receiving the RRC signaling, the terminal device may learn, based on the RRC signaling, the first BP or the second BP allocated by the network device to and activated by the network device for the terminal device. Alternatively, the network device may notify, by using other signaling, the first BP or the second BP allocated to and activated for the terminal device. For example, the network device notifies, by using dedicated signaling, the first BP or the second BP allocated to and activated for the terminal device. How the network device notifies the first BP or the second BP is not limited in embodiments of the present application. For a case in which the network device configures the plurality of BPs for the terminal device, refer to the foregoing descriptions. Details are not described again.

In another specific implementation, the plurality of BPs belong to a same BP group, and all BPs in the BP group correspond to a same numerology. In this case, the network device sends configuration signaling to the terminal device to carry an ID of the BP group. The terminal device may store a correspondence between the ID of the BP group and all the BPs included in the BP group. In other words, the terminal device may determine, based on the ID of the BP group and the correspondence, all the BPs included in the BP group. Further, after all the BPs included in the BP group are determined, a size and frequency domain location information of each BP included in the BP group may be determined.

In another specific implementation, each BP in the BP group corresponds to one BP index. The network device may indicate an index of each BP in the BP group by using configuration signaling sent to the terminal device, and the terminal device determines the plurality of BP based on the received BP index.

The configuration signaling may be, for example, higher layer signaling, such as RRC signaling or a MAC CE, or other dedicated signaling. This is not specifically limited in this application.

The foregoing manner is used as an example. A configuration manner of a BP is not specifically limited in this application. A person skilled in the art of this application may understand that the BP may be alternatively configured in another manner. Details are not described in this application.

S203. The network device sends a first TB to the terminal device.

S204. The terminal device receives the first TB sent by the network device.

How a resource is mapped to the TB sent by the network device to the terminal device on the plurality of BPs in different cases is specifically described below based on whether the first BP and the second BP correspond to the same numerology.

In a first specific implementation, when the first BP and the second BP correspond to the same numerology, the first TB is mapped onto the first BP and the second BP.

Figure 3:
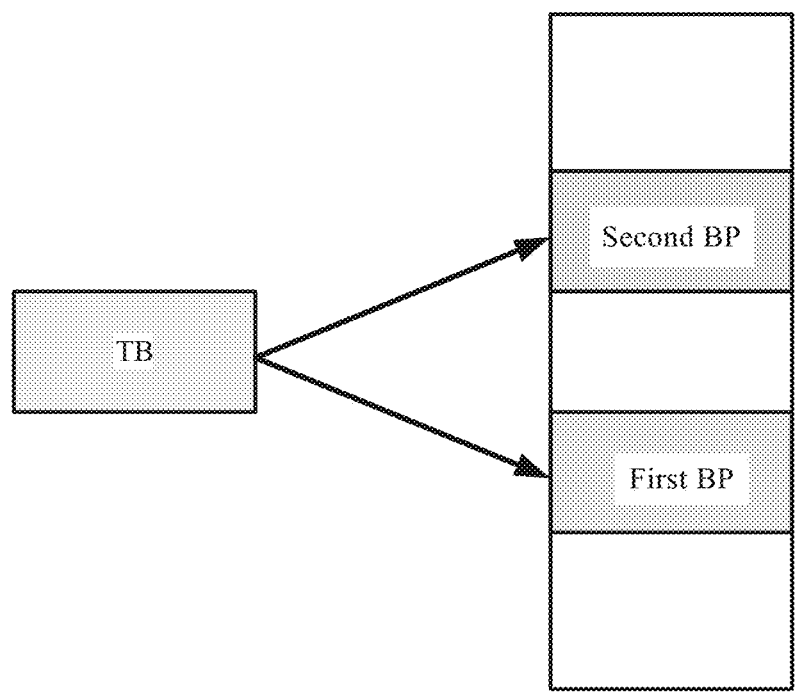
FIG. 3 is a schematic diagram of a first resource mapping relationship according to an embodiment of this application.

Specifically, the first BP and the second BP may be continuously distributed or discontinuously distributed in frequency domain, and the first BP and the second BP may overlap or may be orthogonal in frequency domain. For a case in which BPs are discontinuously distributed, for example, in a possible manner, in a network scenario in which LTE and NR coexist, as shown in FIG. 3, a larger BP of the terminal device may be occupied by the LTE, and two discontinuous BPs in frequency domain may be generated, namely, the first BP and the second BP. The first BP and the second BP have the same numerology. In another possible manner, a middle part occupied by the LTE is a common synchronization signal, but a numerology used by the synchronization signal is different from the numerology used by the first BP and the second BP. Therefore, the first BP and the second BP need to be aggregated and configured for use by the terminal device.

For a case in which BPs are continuously distributed, for example, the terminal device currently works on the first BP, the first BP may be, for example, the BP configured by the network device for the terminal device during the initial access of the terminal device, and a bandwidth of the first BP may be relatively small. For a service requirement, after the terminal device accesses the network, more BPs need to be configured. If the terminal device continuously uses the first BP to work, available resources of the terminal device may be insufficient. Therefore, a base station may configure, for the terminal device, the second BP that is continuously distributed with the first BP in frequency domain, so that the terminal device can work better. Alternatively, when a to-be-transmitted service type of the terminal device changes, the network device may also reallocate a BP to the terminal device, for example, allocates the second BP to match a service type requirement of the terminal device. Alternatively, when the network device needs to perform system load balancing, the network device may reallocate a BP to the terminal device, for example, allocates the second BP to effectively improve system resource utilization.

A person skilled in the art may understand that a specific distribution status of the first BP and the second BP is not specifically limited in this application.

When the network device sends the first TB to the terminal device, the network device generates one TB, namely, the first TB, for the first BP and the second BP, and maps a frequency domain resource of the first TB onto the first BP and the second BP.

In this application, for a plurality of BPs that have a same numerology, if a method in which one TB corresponds to one BP is still used, one piece of DCI needs to be correspondingly configured for each BP. Therefore, resources are wasted, and the terminal device consumes a large amount of power when detecting each piece of DCI. According to the foregoing solution provided in this application, when the first BP and the second BP correspond to the same numerology, a resource is mapped to the first TB on the first BP and the second BP, so that the network device needs to send only one piece of DCI. According to the solution in this application, system overheads caused by sending of the DCI can be effectively reduced, system resources are saved, and energy consumption required for detecting a plurality of pieces of DCI by the UE are also reduced.

A person skilled in the art may understand that if the network device further configures and activates a fourth BP for the terminal device, and the fourth BP corresponds to the same numerology as the first BP and the second BP, a resource is mapped to the first TB on the first BP, the second BP, and the fourth BP. A solution in which the network device configures more BPs for the terminal device is similar to this. Details are not described. To be specific, the network device configures a plurality of BPs for the terminal device, and all the plurality of BPs correspond to a same numerology. In this case, a resource is mapped on all BPs included in the plurality of BPs to the first TB sent by the network device to the terminal device.

In another specific implementation, when the first BP and the second BP correspond to the same numerology, a physical resource block PRB index of the first BP and a PRB index of the second BP are consecutively numbered in a frequency domain resource occupied by the first BP and the second BP.

Referring to FIG. 3, the PRB index of the first BP and the PRB index of the second BP are numbered together. As shown in FIG. 3, in a frequency domain ascending manner, a start number of PRB indexes is a number of a lowest PRB in frequency domain of the first BP, and an end number is a number of a highest PRB in frequency domain of the second BP. For example, the number of the lowest PRB in frequency domain of the first BP is 0 (that is, the start number), a number of a highest PRB in frequency domain of the first BP is j, a number of a lowest PRB in frequency domain of the second BP is j+1, and the number of the highest PRB in frequency domain of the second BP is k, where k is an end number in continuous numbers. A specific form of the number of the PRB is not specifically limited in this application.

It should be noted that a solution corresponding to two or more BPs is similar to the solution corresponding to FIG. 3, and PRB indexes of a plurality of BPs are consecutively numbered in frequency domain resources occupied by the plurality of BPs. To be specific, a start number of PRB indexes is a number of a lowest PRB in frequency domain of a start BP in the plurality of BPs, and an end number is a number of a highest PRB in frequency domain of a last BP in the plurality of BPs. The PRB indexes are consecutively numbered between the start number and the end number in the frequency domain ascending manner. Certainly, in this application, in a frequency domain descending manner, a start BP is a highest BP in frequency domain, and a start number is a number of a highest PRB in frequency domain of the start BP; an end BP is a lowest BP in frequency domain, and an end number is a number of a lowest PRB in frequency domain of the end BP; and PRB indexes are consecutively numbered between the start number and the end number in the frequency domain descending manner.

The plurality of BPs with the same numerology are numbered with consecutive PRB numbers, so that relatively large resource allocation overheads caused by unified numbering at a cell bandwidth granularity are effectively reduced. Further, the plurality of BPs are consecutively numbered, thereby effectively avoiding overheads of an indication field that is used to indicate internal resource configuration information of a single BP when the BP is independently numbered.

In another specific implementation, when the first BP and the second BP correspond to the same numerology, before the network device sends the first TB to the terminal device, the method further includes: sending, by the network device, first control information to the terminal device.

A manner of determining a frequency domain location of the first control information is specifically described below.

In a specific implementation, the network device sends first information to the terminal device, and the terminal device receives the first information. The first information is used to indicate a time-frequency location of the first control information.

Specifically, the first control information is configured in the first BP or the second BP, and is used to schedule the first BP and the second BP. In other words, the first BP and the second BP share a control resource set (CORESET). The terminal device can determine the frequency domain location of the first control information, that is, a BP on which the first control information is configured, and a corresponding time domain location based on only an indication of the first information. Therefore, only the CORESET configured in the first BP or the second BP needs to be monitored. In other words, only a CORESET configured in one of the two BPs needs to be monitored, and a CORESET configured in the other BP does not need to be configured. A solution of a plurality of BPs is similar to this. Only a CORESET configured in one of the plurality of BPs needs to be monitored, and a CORESET configured in other BPs does not need to be monitored. Therefore, resources consumed by the UE in detecting a CORESET configured in each BP can be effectively reduced, thereby helping save energy of the terminal device.

The first information may be carried in higher layer signaling, such as RRC signaling or a MAC CE, or may be carried in dedicated signaling. This is not specifically limited in this application. The first information may be, for example, a bit that carries a plurality of pieces of identifier information of 0 or 1, and the bit is used to indicate the frequency domain location of the first control information. For example, the first information is carried by three bits. When only one CORESET is configured in the first BP, an identifier information sequence 001 corresponding to the bit may be used to indicate that the first control information is configured in the first BP. When a plurality of CORESETs are configured in the first BP, an identifier information sequence 001 corresponding to the bit may be used to indicate a CORESET that is of the first TB and in which the first control information is specifically configured. For example, the first information may be alternatively a plurality of bits that carry identifier information of 0 or 1, and each bit corresponds to one BP or a CORESET configured in one BP. When each bit is 0 or 1, the first information is used to identify a specific BP corresponding to the first control information or a CORESET in the specific BP. For example, the first information includes three bits, and the three bits are respectively defined as L bits, M bits, and N bits for example, where the L bits, the M bits, and the N bits respectively correspond to the first BP, the second BP, and a third BP. As an example, when the L bits are 1, and the M bits and the N bits are 0, it indicates that the first control information is configured in the first BP. When the L bits and the N bits are 0, and the M bits are 1, it indicates that the first control information is configured in the second BP. Certainly, alternatively, the L bits may be 0, and the M bits and the N bits may be 1, to indicate that the first control information is configured in the first BP. When the L bits and the N bits are 0, and the M bits are 1, it indicates that the first control information is configured in the second BP. A meaning represented by the bit 0 or the bit 1 is not specifically limited in this application. The first information may be, for example, an index of each BP. For example, "0" indicates that the first control information is configured in the first BP, and "1" indicates that the first control information is configured in the second BP. A specific form of the first information is not specifically limited in this application.

In another specific implementation, one BP may correspond to a plurality of CORESETs, and the plurality of CORESETs correspond to a same numerology. In this way, a diversity effect can be obtained, DCI transmission reliability is increased, and a collision probability of DCI resources of different terminal devices in one CORESET can also be reduced. For downlink transmission, a numerology of CORESETs of one BP may be the same as that of the BP, and in this way, complexity of switching numerologies by the UE can be reduced. For uplink transmission, because an uplink BP and a downlink BP are independently configured, numerologies of corresponding CORESETs may be different from or the same as the numerology of the BP.

If a plurality of BPs correspond to a same numerology, a same CORESET group may be configured for the plurality of BPs. In other words, a same CORESET group is configured for all BPs in the plurality of BPs; or one BP group corresponds to one CORESET group, and the one BP group may include a plurality of BPs. In this case, if DCI corresponding to the CORESET group points to a same TB, the plurality of BPs are mapped by using the same TB. The DCI corresponding to the CORESET group is DCI that needs to be detected by the UE. If DCI corresponding to the plurality of CORESETs points to different TBs, for example, during non-coherent joint transmission, the plurality of BPs are mapped by using the different TBs.

In CORESET groups configured for a plurality of BPs with a same numerology, a plurality of CORESETs configured for the plurality of BPs have at least one common CORESET, and the common CORESET is used to carry the first control information by default. In this case, optionally, the network device may not need to indicate the time-frequency location of the first control information to the terminal device.

In a specific implementation, the first control information includes indication information used to indicate a first hybrid automatic repeat request (HARQ) process. In this application, indication information of a HARQ process is used to indicate a process number of a transmitted TB, and the process number is used to perform HARQ combination on initially transmitted and retransmitted data when the UE receives data, to obtain a specific combined gain. In this implementation, two BPs correspond to one TB, and further correspond to a unique HARQ process.

In another specific implementation, when the first BP and the second BP correspond to the same numerology, before the network device sends the first transport block TB to the terminal device, the method further includes: determining, by the network device based on a bandwidth of the first BP and a bandwidth of the second BP, a size of an RBG allocated to the first TB; and determining, by the terminal device based on the bandwidth of the first BP and the bandwidth of the second BP, the size of the RBG allocated to the first TB.

The following specifically describes two possible cases in which the size of the RBG allocated to the first TB is determined based on the bandwidth of the first BP and the bandwidth of the second BP.

Case 1: When the first BP and the second BP do not overlap in frequency domain, the determining, by the network device based on a bandwidth of the first BP and a bandwidth of the second BP, a size of an RBG allocated to the first TB specifically includes: determining, by the network device based on a sum of the bandwidth of the first BP and the bandwidth of the second BP, the size of the RBG allocated to the first TB; and the determining, by the terminal device based on the bandwidth of the first BP and the bandwidth of the second BP, the size of the RBG allocated to the first TB specifically includes: determining, by the terminal device based on the sum of the bandwidth of the first BP and the bandwidth of the second BP, the size of the RBG allocated to the first TB. For example, if the bandwidth of the first BP is M and the bandwidth of the second BP is N, the sum of the bandwidth of the first BP and the bandwidth of the second BP is B. and B=M+N.

Case 2: When the first BP and the second BP overlap in frequency domain, the determining, by the network device based on a bandwidth of the first BP and a bandwidth of the second BP, a size of an RBG allocated to the first TB specifically includes: determining, by the network device based on a bandwidth spanned by the first BP and the second BP in frequency domain, the size of the RBG allocated to the first TB; and the determining, by the terminal device based on the bandwidth of the first BP and the bandwidth of the second BP, the size of the RBG allocated to the first TB specifically includes: determining, by the terminal device based on the bandwidth spanned by the first BP and the second BP in frequency domain, the size of the RBG allocated to the first TB. For example, the bandwidth spanned by the first BP and the second BP in frequency domain is F, the bandwidth of the first BP is W, the bandwidth of the second BP is U, and a bandwidth of an overlapping part between the first BP and the second BP is S, F=W+U−S. For example, if the first BP the second BP overlap in frequency domain, the first BP is 10 MHz, the second BP is 20 MHz, and an overlapping part between the first BP and the second BP is 5 MHz, the bandwidth spanned by the first BP and the second BP in frequency domain is 25 MHz. In this case, the terminal device determines, based on the bandwidth of 25 MHz, the size of the RBG allocated to the first TB.

Figure 4A:
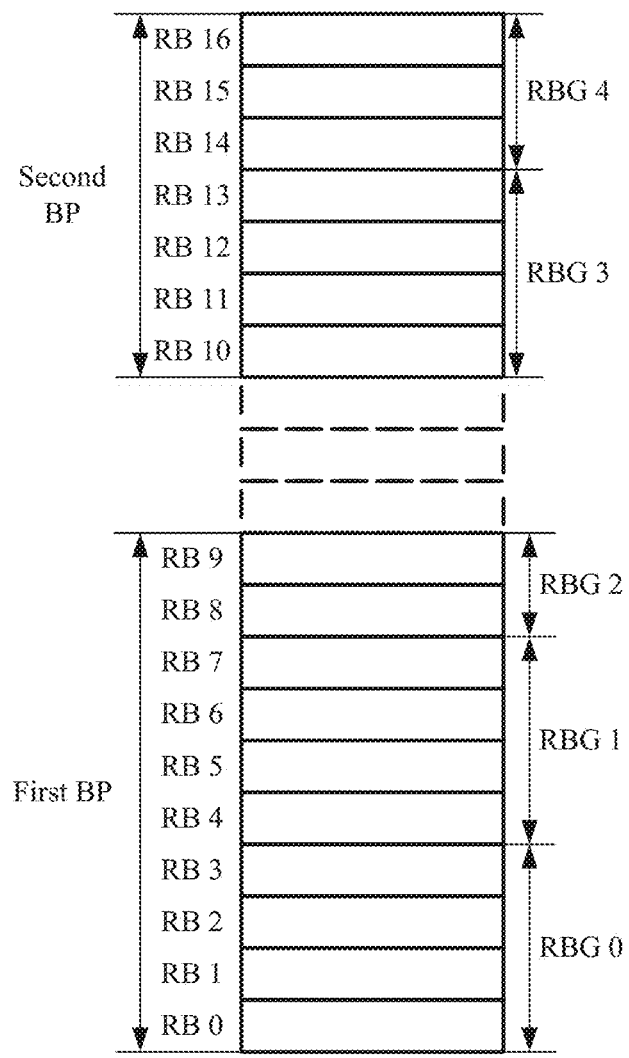
FIG. 4A is a schematic diagram of descriptions of an RBG number according to an embodiment of this application.
Figure 4B:
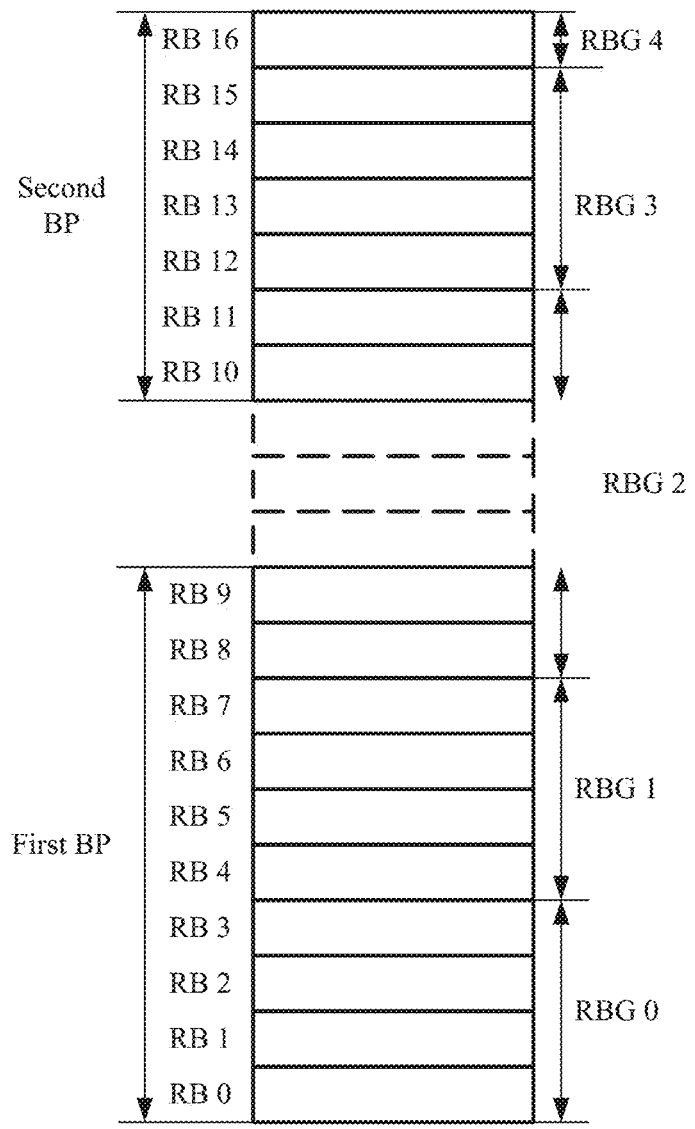
FIG. 4B is a schematic diagram of descriptions of an RBG number according to an embodiment of this application.

A size of an RBG (referred to as an RBG Size below) is specifically described below with reference to FIG. 4A and FIG. 4B.

Based on a definition of the RBG size in LTE, a size of a corresponding RBG is defined for a bandwidth range, as shown in the following table:

TABLE 1

Type 0 resource configuration RBG Size vs. Downlink system bandwidth

| System Bandwidth $N_{RB}^{DL}$ | RBG Size (P) |
|---|---|
| ≤10 | 1 |
| 11 to 26 | 2 |
| 27 to 63 | 3 |
| 64 to 110 | 4 |

In this embodiment, a joint bandwidth of the first BP and the second BP needs to be used to replace the system bandwidth in the table, to determine the size of the corresponding RBG. RBG numbers do not cross a BP. As shown in FIG. 4A, a size of an RBG is 4, a first BP has 10 RBs, a second BP has 7 RBs, and a number of the RBG is shown in the figure. A quantity of RBs included in a last RBG may be less than 4. Therefore, an RBG 2 includes only two RBs, and an RBG 4 includes only three RBs. Alternatively, RBG numbers cross BP. As shown in FIG. 4B, a size of an RBG is 4, a first BP has 10 RBs, a second BP has 7 RBs, and RBG numbers are shown in FIG. 4B. An RBG 2 includes two RBs of the first BP and two RBs of the second BP, and a quantity of RBs included in a last RBG may be less than 4. Therefore, an RBG 4 includes only one RB. The foregoing joint bandwidth of the first BP and the second BP corresponds to the sum of the bandwidth of the first BP and the bandwidth of the second BP in the case 1, or corresponds to the bandwidth spanned by the first BP and the second BP in frequency domain in the case 2. For ease of description, in this application, the joint bandwidth of the first BP and the second BP is used to represent the two cases.

The RBG size in this application may be, for example, 1, 2, 3, or 4 defined in the LTE, or may be a value discussed in an NR system, for example, 2, 4, 8, or 16. The RBG size may be a quantity of virtual resource blocks (English: virtual resource block, VRB) included in each RBG defined in the LTE, or may be a possible definition in the NR system, for example, a quantity of resource units included in each RBG. The resource unit may be, for example, a resource element (RE), an RB, a VRB, a PRB, or another unit. This is not specifically limited in this application. In the LTE, the network device transmits a TB to the terminal device by using a downlink shared physical channel (PDSCH). The PDSCH is transmitted in a data area of a downlink subframe. A downlink PDSCH resource is allocated based on the VRB. There is a specific correspondence between the VRB and the PRB. The terminal device stores a correspondence between a bandwidth and an RBG size. After determining the joint bandwidth of the first BP and the second BP, the terminal device determines, based on the joint bandwidth of the first BP and the second BP, the size of the RBG allocated to the first TB, and finally determines a time-frequency location of a PRB occupied when the first TB is transmitted. In the NR system, the network device transmits a TB to the terminal device by using a physical channel whose function is the same as or similar to that of the PDSCH. When the TB is transmitted, a resource of the physical channel is allocated based on the VRB or a resource block that has a same or similar definition as the VRB.

Figure 5:
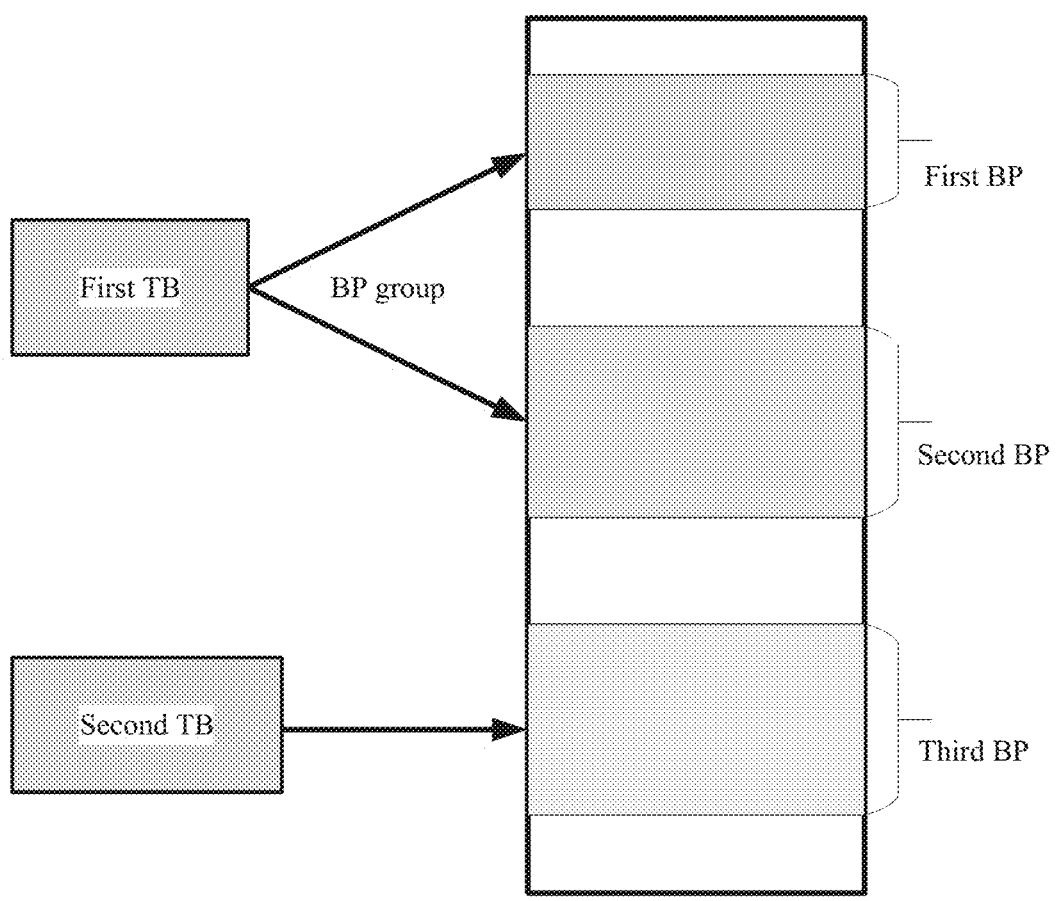
FIG. 5 is a schematic diagram of a second resource mapping relationship according to an embodiment of this application.

In a specific implementation, referring to FIG. 5, when the first BP and the second BP correspond to the same numerology, the first BP and the second BP are in a same BP group. Optionally, the BP group includes the first BP and the second BP. In this case, before S202, the method further includes: sending, by the network device, second information to the terminal device, and receiving, by the terminal device, the second information. The second information is used to indicate an identifier ID of the BP group, all BPs included in the BP group correspond to a same numerology, and the ID of the BP group is used by the terminal device to determine the first BP and the second BP.

In a specific implementation, the terminal device may store a correspondence between the ID of the BP group and all the BPs included in the BP group. In other words, the terminal device may determine, based on the ID of the BP group and the correspondence, all the BPs included in the BP group. Further, after all the BPs included in the BP group are determined, a size and location information of each BP included in the BP group may be determined.

In another specific implementation, the second information may further include indication information that is used to indicate an index of each BP included in the BP group, and the index of each BP included in the BP group may be determined according to the indication information, to determine all the BPs included in the BP group that is configured by the network device for the terminal device. Optionally, when the BP group includes only the first BP and the second BP, the indication information includes only first indication information that is used to indicate an index of the first BP and second indication information that is used to indicate an index of the second BP. Optionally, when the BP group includes the first BP, the second BP, and a fourth BP, the indication information includes the first indication information, the second indication information, and third indication information that is used to indicate an index of the fourth BP. A case in which the BP group includes more BPs is similar to this. Details are not described.

In a specific implementation, the ID of the BP group is further used by the terminal device to determine a bandwidth of each BP included in the BP group. Specifically, the terminal device may determine, based on the ID of the BP group, configuration information of all the BPs included in the BP group, and determine location information and a size of each BP based on the configuration information of each BP, to further determine a bandwidth of each BP in the BP group.

In a specific implementation, the network device determines, based on bandwidths of all the BPs included in the BP group, the size of the RBG allocated to the first TB. Similarly, the terminal device determines, based on the bandwidths of all the BPs included in the BP group, the size of the RBG allocated to the first TB. For a related description of the size of the RBG and how to determine the size of the RBG allocated to the first TB, refer to the foregoing specific descriptions. Details are not described herein again.

In a specific implementation, the network device further configures and activates a third BP for the terminal device. If a numerology corresponding to the third BP is different from a numerology corresponding to each BP in the BP group, the method 200 further includes: sending, by the network device, a second TB to the terminal device, and receiving, by the terminal device, the second TB sent by the network device, where the second is mapped onto the third BP. To be specific, in this application, when a plurality of BPs correspond to a same numerology, the network device correspondingly generates one TB for the plurality of BPs, namely, the first TB, and a resource is mapped to the first TB on the plurality BPs. When a plurality of BPs correspond to different numerologies, the network device generates one TB for each BP having a different numerology, and a resource is mapped to each TB on each BP. For example, if the first BP and the second BP correspond to the same numerology and belong to a same BP group, the first TB is mapped onto the first BP and the second BP. If the third BP, the first BP, and the second BP correspond to different numerologies, the network device generates the second TB, and the second TB is mapped onto the third BP. A piece of control information is configured in the third BP, and is used to schedule the third BP. The terminal device detects the control information configured in the third BP.

Figure 6:
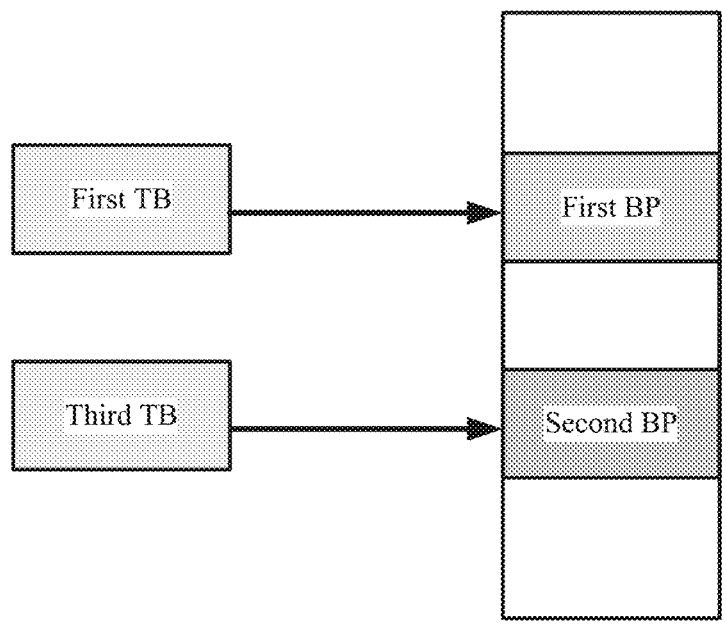
FIG. 6 is a schematic diagram of a third resource mapping relationship according to an embodiment of this application.

In another specific implementation, referring to FIG. 6, when the first BP and the second BP correspond to the different numerologies, the method further includes the following steps:

The network device sends a third TB to the terminal device, and the terminal device receives the third TB sent by the network device. A resource is mapped to the first BP on the first BP, and the third TB is mapped onto the second BP.

According to the foregoing solution provided in this application, when the first BP and the second BP correspond to the different numerologies, a method in which different TBs correspond to different BPs is used, thereby effectively resolving a problem of how to map a resource to a TB when the UE supports a plurality of different BPs at the same time.

In a specific implementation, when the first BP and the second BP correspond to the different numerologies, a PRB index of the first BP is independently numbered in the first BP, and a PRB index of the second BP is independently numbered in the second BP.

That the PRB index of the first BP is independently numbered in the first BP means that PRBs in the first BP are consecutively numbered in a frequency domain ascending manner in a frequency domain resource occupied by the first BP. A start number of PRB indexes of the first BP is a number of a lowest PRB in frequency domain of the first BP, and an end number is a number of a highest PRB in frequency domain of the first BP. For example, the start number may be 0, the end number may be m, and m is an integer greater than 0. Related descriptions of independently numbering PRB indexes of the second BP in the second BP are similar to this. Details are not described. Continuous numbering may also be performed in a frequency domain descending manner. For specific descriptions, refer to the foregoing descriptions. Details are not described herein again. If the network device configures, for the terminal device, a plurality of BPs that respectively correspond to different numerologies, each BP is independently numbered in the respective BP. For a numbering manner, refer to the foregoing descriptions. Details are not described herein again.

Independent numbering is performed in the BP, thereby effectively reducing relatively large resource allocation overheads caused by unified numbering at a cell bandwidth granularity.

In a specific implementation, when the first BP and the second BP correspond to the different numerologies, before the network device sends the first TB and the third TB to the terminal device, the method further includes the following steps:

The network device sends second control information and third control information to the terminal device, and the terminal device receives the second control information and the third control information. The second control information is used to schedule the first BP, and the third control information is used to schedule the second BP.

For specific descriptions of the third control information and second information, refer to the foregoing descriptions of the first control information. Details are not described herein again.

In a specific implementation, when the first BP and the second BP correspond to the different numerologies, before the network device sends the first TB and the third TB to the terminal device, the method further includes: determining, by the network device based on the bandwidth of the first BP, the size of the RBG allocated to the first TB, and determining, based on the bandwidth of the second BP, a size of an RBG allocated to the third TB. Correspondingly, after receiving the first TB and the third TB, the terminal device determines, based on the bandwidth of the first BP and the bandwidth of the second BP, the sizes of the corresponding RBGs.

For related descriptions of the size of the RBG, refer to the foregoing specific descriptions of the size of the RBG. Details are not described herein again.

In a specific implementation, when the first BP and the second BP correspond to the different numerologies, before the network device sends the first TB and the third TB to the terminal device, the method further includes the following steps:

Step A: The network device allocates a first HARQ process to the first TB, and sends third information to the terminal device, where the third information is used to indicate an ID of the first HARQ process.

The third information may be carried in the second control information, or may be carried in higher layer signaling, such as RRC signaling or a MAC CE, or other dedicated signaling. This is not specifically limited in this application.

Step B: The network device allocates a second HARQ process to the third TB, and sends fourth information to the terminal device, where the fourth information is used to indicate an ID of the second HARQ process.

The fourth information may be carried in the third control information, or may be carried in higher layer signaling, such as RRC signaling or a MAC CE, or other dedicated signaling. This is not specifically limited in this application.

Step C: The terminal device receives the third information sent by the network device.

Step D: The terminal device receives the fourth information sent by the network device.

The network device allocates respective HARQ processes to different TBs, and the terminal device performs HARQ combination based on IDs of the respective HARQ processes, thereby improving transmission reliability.

According to the foregoing solution provided in this application, a resource mapping problem for a TB when a plurality of activated BPs are configured in one UE device at the same time is effectively resolved, thereby helping save system resources and reduce energy consumption of the terminal device.

Apparatuses corresponding to the foregoing method embodiments are described below with reference to the accompanying drawings.

Figure 7:
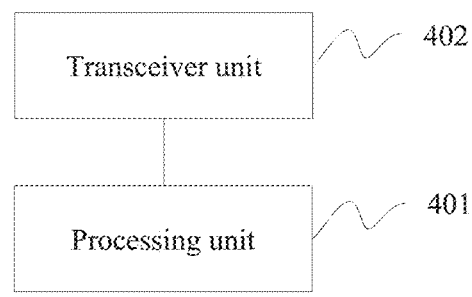
FIG. 7 is a schematic structural diagram of a network device according to an embodiment of this application.

FIG. 7 is a schematic diagram of a network device 400 according to an embodiment of this application. The network device 400 may be applied to the scenario shown in FIG. 1, and is configured to perform the method corresponding to FIG. 2. As shown in FIG. 7, the network device 400 includes a processing unit 401 and a transceiver unit 402. The transceiver unit may be specifically configured to perform information receiving and sending performed by the network device in the method 200. The processing unit 401 is specifically configured to perform processing other than information receiving and sending performed by the network device in the method 200.

For example, the processing unit 401 may be configured to configure a first bandwidth part BP and a second BP for a terminal device. The transceiver unit 402 may be configured to send a first transport block TB to the terminal device. When the first BP and the second BP correspond to a same numerology (numerology), the first TB is mapped onto the first BP and the second BP.

For specific content, refer to descriptions of related parts in the method 200. Details are not described herein again.

Figure 8:
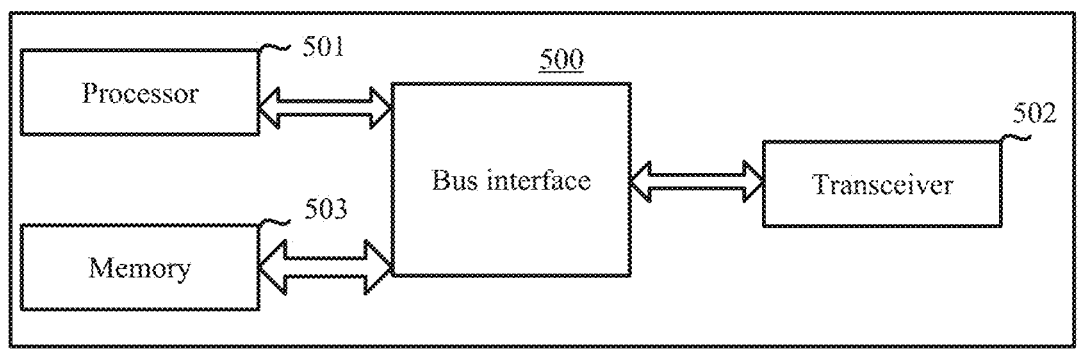
FIG. 8 is a schematic structural diagram of another network device according to an embodiment of this application.

It should be understood that division of the foregoing units is merely logical function division. In actual implementation, all or some of units may be integrated into one physical entity, or may be physically separated. In embodiments of this application, the transceiver unit 402 may be implemented by a transceiver, and the processing unit 402 may be implemented by a processor. As shown in FIG. 8, a network device 500 may include a processor 501, a transceiver 502, and a memory 503. The memory 503 may be configured to store a program/code that is pre-installed when the network device 500 is delivered from a factory, or may store code or the like executed by the processor 501.

It should be understood that the network device 500 according to this embodiment of this application may correspond to the network device in the method 200 according to the embodiment of this application. The transceiver 502 is configured to perform information receiving and sending performed by the network device in the method 200, and the processor 501 is configured to perform processing other than information receiving and sending performed by the network device in the method 200. Details are not described herein again.

Figure 9:
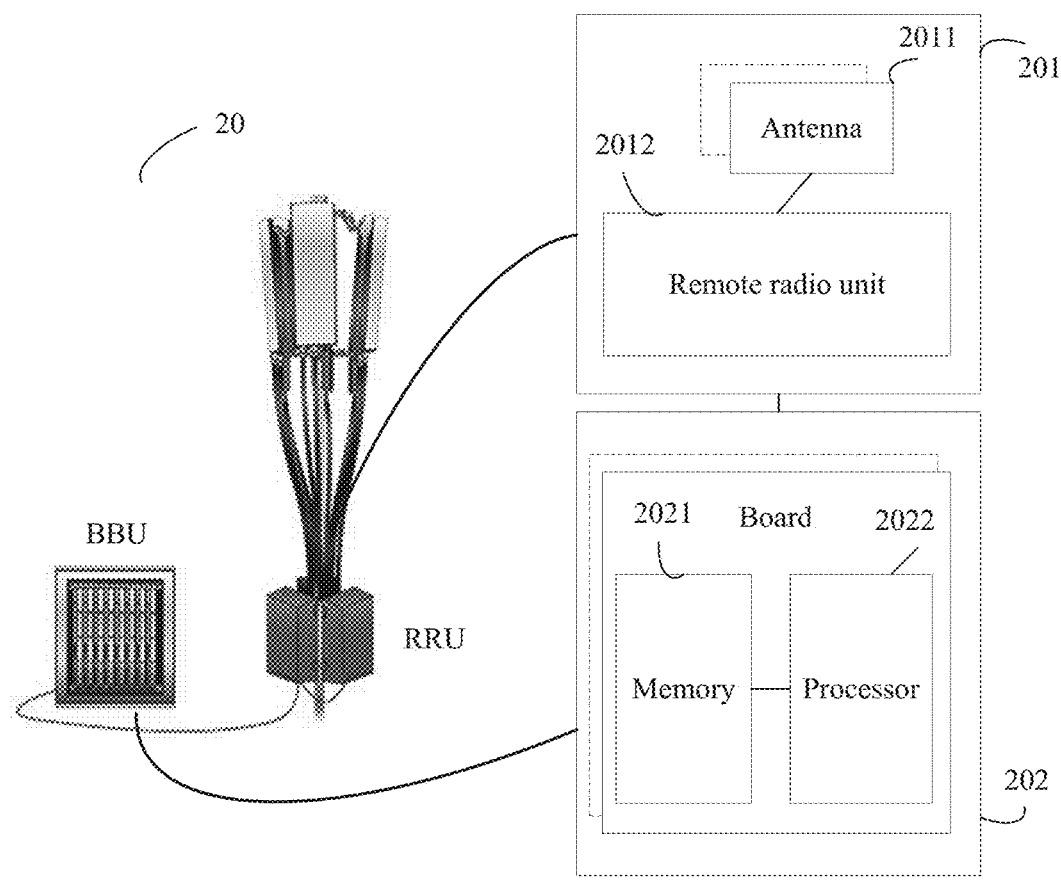
FIG. 9 is a schematic structural diagram of another network device according to an embodiment of this application.

FIG. 9 is a schematic structural diagram of a network device 20. For example, the network device 20 may be a base station. The network device 20 may be applied to the system shown in FIG. 1, and is configured to perform the method corresponding to FIG. 2. The network device 20 includes one or more remote radio units (RRU) 201 and one or more baseband units (BBU) 202. The RRU 201 may be referred to as a transceiver unit, a transceiver, a transceiver circuit, or the like, and may include at least one antenna 2011 and at least one radio frequency unit 2012. The RRU 201 is mainly configured to receive and send a radio frequency signal and convert between a radio frequency signal and a baseband signal, for example, is configured to perform information receiving and sending performed by the network device in the method 200. The BBU 202 is mainly configured to perform baseband processing, control the network device, and the like. The RRU 201 and the BBU 202 may be physically disposed together, or may be physically separated, for example, may be distributed base stations.

The BBU 202 is a control center of the network device, may also be referred to as a processing unit, and is mainly configured to complete baseband processing functions such as channel coding, multiplexing, modulation, and spectrum spreading. For example, the BBU (the processing unit) may be configured to control the network device to perform processing other than information receiving and sending processing in the method 200.

For example, the BBU 202 may include one or more boards, and a plurality of boards may jointly support a radio access network (such as an LTE network) of a single access standard, or may separately support radio access networks of different access standards. The BBU 202 further includes a memory 2021 and a processor 2022. The memory 2021 is configured to store a necessary instruction and data. The processor 2022 is configured to control the network device to perform a necessary action, for example, is configured to control the network device to perform processing other than information receiving and sending processing in method 200. The memory 2021 and the processor 2022 may serve one or more boards. In other words, a memory and a processor may be separately disposed on each board. Alternatively, a plurality of boards may share a same memory and a same processor. In addition, a necessary circuit is further disposed on each board.

Figure 10:
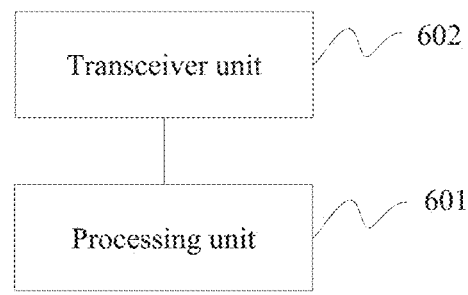
FIG. 10 is a schematic structural diagram of a terminal device according to an embodiment of this application.

FIG. 10 is a schematic diagram of a terminal device 600 according to an embodiment of this application. The terminal device 600 may be applied to the scenario shown in FIG. 1, and is configured to perform the method shown in FIG. 2. As shown in FIG. 10, the terminal device 600 includes a processing unit 601 and a transceiver unit 602. The transceiver unit 602 may be specifically configured to perform information receiving and sending performed by the terminal device in the method 200. The processing unit 601 is specifically configured to perform processing other than information receiving and sending performed by the terminal device in the method 200.

For example, the processing unit 601 is configured to determine a first bandwidth part BP and a second BP. The transceiver unit 602 is configured to receive a first transport block TB sent by a network device. When the first BP and the second BP correspond to a same numerology, the first TB is mapped onto the first BP and the second BP.

For specific content, refer to specific descriptions in the method 200. Details are not described herein again.

Figure 11:
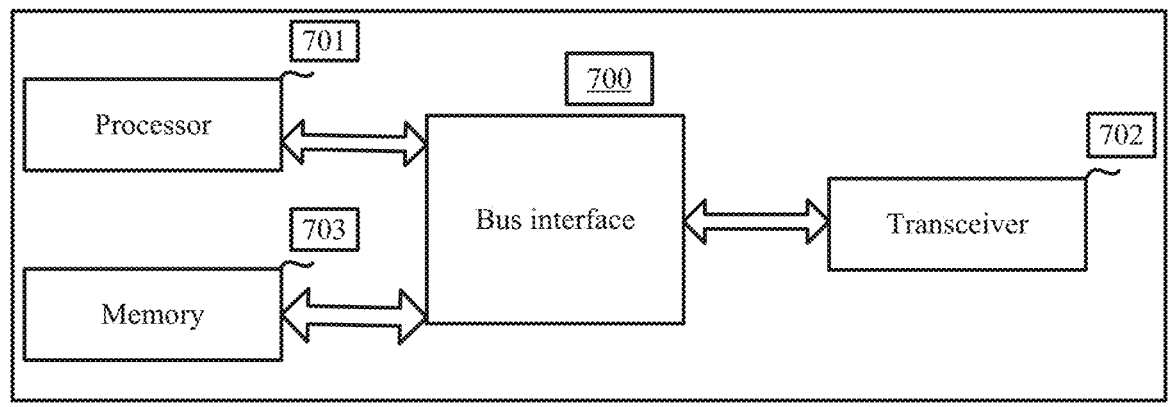
FIG. 11 is a schematic structural diagram of another terminal device according to an embodiment of this application.

It should be understood that division of the foregoing units is merely logical function division. In actual implementation, all or some of units may be integrated into one physical entity, or may be physically separated. In embodiments of this application, the transceiver unit 602 may be implemented by a transceiver, and the processing unit 601 may be implemented by a processor. As shown in FIG. 11, a terminal device 700 may include a processor 701, a transceiver 702, and a memory 703. The memory 703 may be configured to store a program/code that is pre-installed before the terminal device 700 is delivered from a factory, or may store code executed by the processor 701, or the like.

It should be understood that the terminal device 700 according to this embodiment of this application may correspond to the terminal device in the method 200 according to the embodiment of this application. The transceiver 702 is configured to perform information receiving and sending performed by the terminal device in the method 200, and the processor 701 is configured to perform processing other than information receiving and sending performed by the terminal device in the method 200. Details are not described herein again.

Figure 12:
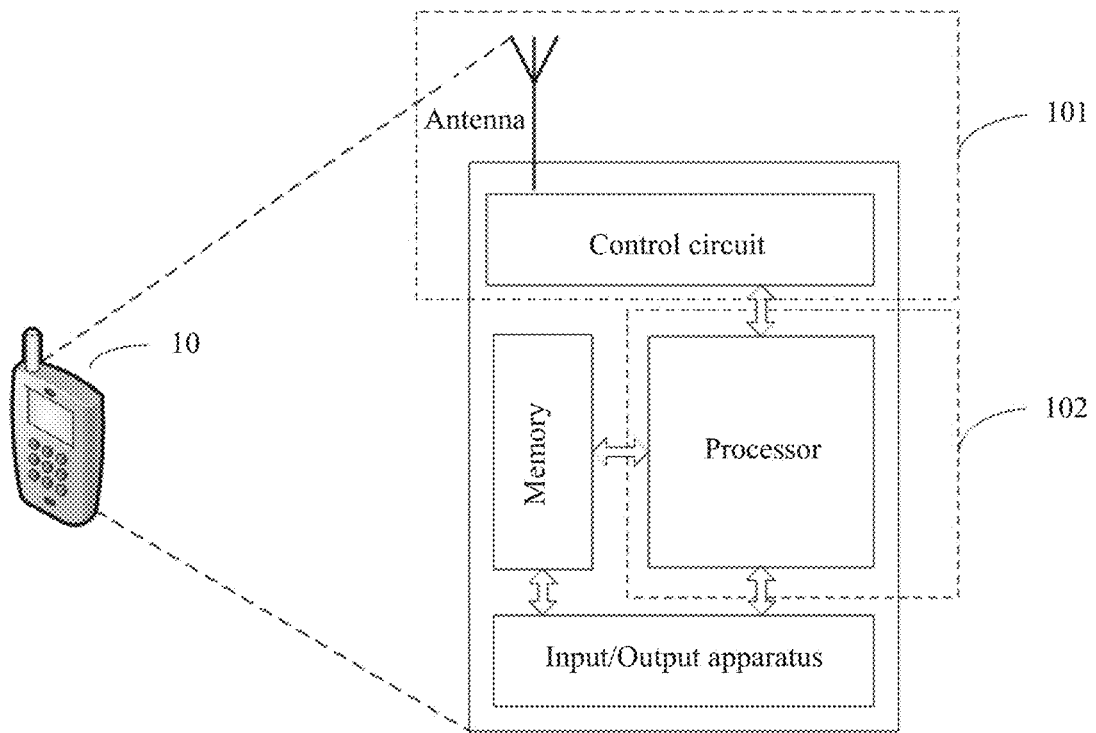
FIG. 12 is a schematic structural diagram of another terminal device according to an embodiment of this application.

FIG. 12 is a schematic structural diagram of a terminal device. The terminal device may be applied to the scenario shown in FIG. 1, to perform the method corresponding to FIG. 2. For ease of description, FIG. 12 shows only main components of the terminal device. As shown in FIG. 12, a terminal device 10 includes a processor, a memory, a control circuit, an antenna, and an input/output apparatus. The control circuit is mainly configured to convert between a baseband signal and a radio frequency signal and process the radio frequency signal. The control circuit and the antenna may be collectively referred to as a transceiver that is mainly configured to receive and send a radio frequency signal in an electromagnetic wave form and receive a signaling indication and/or a reference signal sent by a base station, and is configured to perform information receiving and sending performed by the terminal device in the method 200. For details, refer to descriptions of the foregoing related parts. The processor is mainly configured to: process a communications protocol and communication data, and control the entire terminal device to execute a software program and process data of the software program, for example, is configured to support the terminal device in performing actions other than information receiving and sending in the method 200. The memory is mainly configured to store the software program and the data. The input/output apparatus, such as a touchscreen, a display screen, or a keyboard, is mainly configured to receive data entered by a user and output data to the user.

After the terminal device is powered on, the processor may read a software program in a storage unit, interpret and execute an instruction in the software program, and process data of the software program. When data needs to be sent in a wireless manner, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that for ease of description, FIG. 12 shows only one memory and one processor. Actual user equipment may include a plurality of processors and a plurality of memories. The memory may also be referred to as a storage medium, a storage device, or the like. This is not limited in embodiments of this application.

In an optional implementation, the processor may include a baseband processor and a central processing unit. The baseband processor is mainly configured to process the communications protocol and the communication data, and the central processing unit is mainly configured to: control the entire terminal device, execute the software program, and process the data of the software program. The processor in FIG. 12 is integrated with functions of the baseband processor and the central processing unit. A person skilled in the art may understand that the baseband processor and the central processing unit may be alternatively processors independent of each other, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communication data may be built into the processor, or may be stored in the storage unit in a form of a software program, and the processor executes the software program to implement a baseband processing function.

For example, in embodiments of this application, the antenna and the control circuit that have receiving and sending functions are considered as a transceiver unit 101 of the terminal device 10, and the processor having a processing function is considered as a processing unit 102 of the UE 10. As shown in FIG. 12, the terminal device 10 includes the transceiver unit 101 and the processing unit 102. The transceiver unit may also be referred to as a transceiver, a transceiver apparatus, or the like. Optionally, a component that is in the transceiver unit 101 and is configured to implement a receiving function is considered as a receiving unit, and a component that is in the transceiver unit 101 and is configured to implement a sending function is considered as a sending unit. In other words, the transceiver unit 101 includes the receiving unit and the sending unit. For example, the receiving unit may also be referred to as a receiver, a receiver circuit, or the like, and the sending unit may also be referred to as a transmitter, a transmit circuit, or the like.

In embodiments of this application, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The memory may include a volatile memory, for example, a random access memory (RAM); or the memory may include a non-volatile memory, such as a read-only memory (ROM), a flash memory, a hard disk drive (HDD), or a solid state drive (SSD); or the memory may include a combination of the foregoing types of memories.

A bus interface may be further included in FIG. 8 to FIG. 11, and the bus interface may include any quantity of interconnected buses and bridges, and specifically, various circuits of one or more processors represented by the processor and memories represented by the memory are linked together. The bus interface may further link together various other circuits, such as a peripheral device, a voltage regulator, and a power management circuit. This is well known in the art, and therefore is not further described in this specification. The bus interface provides an interface. The transceiver provides a unit for communicating with various other devices on a transmission medium. The processor is responsible for bus architecture management and general processing. The memory may store data used when the processor performs an operation.

A person skilled in the art may further understand that various illustrative logical blocks (illustrative logic block) and steps that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The various illustrative logical units and circuits described in the embodiments of this application may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by the processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to the processor, so that the processor may read information from the storage medium and write information to the storage medium. Alternatively, the storage medium may further be integrated into the processor. The processor and the storage medium may be arranged in an ASIC, and the ASIC may be arranged in UE. Optionally, the processor and the storage medium may be arranged in different components of the UE.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in wiredly (for example, a coaxial cable, an optical fiber, or a digital subscriber line (DSL)) or wirelessly (for example, infrared, radio, or microwave). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The embodiments in this specification are all described in a progressive manner, for same or similar parts in the embodiments, refer to each other. Each embodiment focuses on a difference from other embodiments. Especially, apparatus and system embodiments are basically similar to a method embodiment, and therefore are described briefly. For related parts, refer to descriptions in the method embodiments.

According to the foregoing descriptions of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs, but may also be extended to a maximum scope that is consistent with the principles and disclosed new features of this application.

What is claimed is:

1. A communication method, comprising:
   determining, by a terminal device, a first bandwidth part (BP) and a second BP;
   receiving, by the terminal device, a first transport block (TB) from a network device; and
   when the first BP and the second BP correspond to a same numerology:
      determining a sum of a bandwidth of the first BP and a bandwidth of the second BP; and
      subtracting a bandwidth of an overlapping part between the first BP and the second BP from the sum to determine a size of a resource block group (RBG) allocated to the first TB, wherein:
         the first TB is mapped onto the first BP and the second BP; and
         a physical resource block (PRB) index of the first BP and a PRB index of the second BP are consecutively numbered in a frequency domain resource occupied by the first BP and the second BP, wherein a number of a highest PRB in frequency domain of the first BP and a number of a lowest PRB in frequency domain of the second BP are two consecutive numbers.

2. The method according to claim 1, wherein, when the first BP and the second BP correspond to the same numerology, before the receiving, by the terminal device, a first TB from a network device, the method further comprises:
   receiving, by the terminal device, first control information from the network device, wherein the first control information is configured in the first BP or the second BP, and is used to schedule the first BP and the second BP; and
   receiving, by the terminal device, first information from the network device, wherein the first information is used to indicate a time-frequency location of the first control information.

3. The method according to claim 1, wherein, when the first BP and the second BP correspond to the same numerology and the first BP and the second BP are in a same BP group, before the terminal device determines the first BP and the second BP, the method further comprises:
   receiving, by the terminal device, second information from the network device, wherein the second information is used to indicate an identifier (ID) of the BP group, and wherein all BPs comprised in the BP group correspond to a same numerology; and
   wherein determining the first BP and the second BP comprises:
      determining, by the terminal device, the first BP and the second BP based on the ID of the BP group.

4. The method according to claim 3, wherein, when the first BP and the second BP correspond to the same numerology, the method further comprises:
   determining, by the terminal device based on bandwidths of all the BPs comprised in the BP group, the size of the RBG allocated to the first TB.

5. The method according to claim 3, wherein the method further comprises:
   determining, by the terminal device, a third BP; and
   when the first BP and the second BP correspond to the same numerology, and when a numerology corresponding to the third BP is different from the numerology corresponding to the BP group, receiving, by the terminal device, a second TB from the network device, wherein the second TB is mapped onto the third BP.

6. The method according to claim 1, wherein, when the first BP and the second BP correspond to different numerologies, the method further comprises:
   receiving, by the terminal device, a third TB from the network device, wherein the first TB is mapped onto the first BP, and wherein the third TB is mapped onto the second BP.

7. The method according to claim 6, wherein, when the first BP and the second BP correspond to the different numerologies, the PRB index of the first BP is independently numbered in the first BP, and the PRB index of the second BP is independently numbered in the second BP.

8. The method according to claim 6, wherein, when the first BP and the second BP correspond to the different numerologies, the method further comprises:
   determining, by the terminal device based on the bandwidth of the first BP, the size of the RBG allocated to the first TB; and
   determining, by the terminal device based on the bandwidth of the second BP, a size of an additional RBG allocated to the third TB.

9. The method according to claim 6, wherein, when the first BP and the second BP correspond to the different numerologies, the method further comprises:
   receiving, by the terminal device, third information from the network device, wherein the third information is used to indicate an identifier (ID) of a first HARQ process, and wherein the first HARQ process corresponds to the first TB; and
   receiving, by the terminal device, fourth information from the network device, wherein the fourth information is used to indicate an ID of a second HARQ process, and wherein the second HARQ process corresponds to the third TB.

10. A communication method, comprising:
    configuring, by a network device, a first bandwidth part (BP) and a second BP for a terminal device;
    sending, by the network device, a first transport block (TB) to the terminal device; and
    when the first BP and the second BP correspond to a same numerology:
      determining a sum of a bandwidth of the first BP and a bandwidth of the second BP; and
      subtracting a bandwidth of an overlapping part between the first BP and the second BP from the sum to determine a size of a resource block group (RBG) allocated to the first TB, wherein:
        the first TB is mapped onto the first BP and the second BP; and
        a physical resource block (PRB) index of the first BP and a PRB index of the second BP are consecutively numbered in a frequency domain resource occupied by the first BP and the second BP, wherein a number of a highest PRB in frequency domain of the first BP and a number of a lowest PRB in frequency domain of the second BP are two consecutive numbers.

11. A terminal device, comprising:
    at least one processor; and
    a non-transitory computer-readable storage medium coupled to the at least one processor and storing programming instructions for execution by the at least one processor, wherein the programming instructions instruct the at least one processor to:
      determine a first bandwidth part (BP) and a second BP;
      receive a first transport block TB from a network device; and
      when the first BP and the second BP correspond to a same numerology:
        determine a sum of a bandwidth of the first BP and a bandwidth of the second BP; and
        subtract a bandwidth of an overlapping part between the first BP and the second BP from the sum to determine a size of a resource block group (RBG) allocated to the first TB, wherein:
          the first TB is mapped onto the first BP and the second BP; and
          a physical resource block (PRB) index of the first BP and a PRB index of the second BP are consecutively numbered in a frequency domain resource occupied by the first BP and the second BP, wherein a number of a highest PRB in frequency domain of the first BP and a number of a lowest PRB in frequency domain of the second BP are two consecutive numbers.

12. The terminal device according to claim 11, wherein, when the first BP and the second BP correspond to the same numerology, before receiving the first transport block TB from the network device, the programming instructions instruct the at least one processor to:
    receive first control information and first information from the network device, wherein the first control information is configured in the first BP or the second BP, and is used to schedule the first BP and the second BP, and wherein the first information is used to indicate a time-frequency location of the first control information.

13. The terminal device according to claim 11 wherein, when the first BP and the second BP correspond to the same numerology and the first BP and the second BP are in a same BP group, before the processor determines the first BP and the second BP, the programming instructions instruct the at least one processor to:
    receive second information from the network device, wherein the second information is used to indicate an identifier (ID) of the BP group, and wherein all BPs comprised in the BP group correspond to a same numerology; and
    determine the first BP and the second BP based on the ID of the BP group.

14. The terminal device according to claim 13, wherein, when the first BP and the second BP correspond to the same numerology, the programming instructions instruct the at least one processor to:
    determine, based on bandwidths of all the BPs comprised in the BP group, the size of the RBG allocated to the first TB.

15. The terminal device according to claim 13, wherein the programming instructions instruct the at least one processor to:
    determine a third BP; and
    when the first BP and the second BP correspond to the same numerology, and when a numerology corresponding to the third BP is different from the numerology corresponding to the BP group, receive a second TB from the network device, wherein the second TB is mapped onto the third BP.

16. The terminal device according to claim 11, wherein, when the first BP and the second BP correspond to different numerologies, the programming instructions instruct the at least one processor to:
    receive a third TB from the network device, wherein the first TB is mapped onto the first BP, and wherein the third TB is mapped onto the second BP.

* * * * *